United States Patent
Sakamoto et al.

(10) Patent No.: US 6,255,019 B1
(45) Date of Patent: Jul. 3, 2001

(54) CATHODE ACTIVE MATERIAL FOR ALKALINE STORAGE BATTERY AND CATHODE USING THE SAME

(75) Inventors: Hiroyuki Sakamoto; Hidekatsu Izumi, both of Neyagawa; Yoichi Izumi, Moriguchi, all of (JP)

(73) Assignee: Matsushita Electric Industrial Co., Ltd., Osaka-fu (JP)

(*) Notice: Subject to any disclaimer, the term of this patent is extended or adjusted under 35 U.S.C. 154(b) by 0 days.

(21) Appl. No.: 09/260,359

(22) Filed: Mar. 1, 1999

(30) Foreign Application Priority Data

Jun. 15, 1998 (JP) .................................. 10-167077

(51) Int. Cl.$^7$ ............................. H01M 4/32; H01M 4/50; H01M 4/58; H01M 4/52
(52) U.S. Cl. ...................... 429/223; 429/224; 429/218.1; 429/231.95
(58) Field of Search .................... 429/223, 224, 429/218.1, 231.95

(56) References Cited

U.S. PATENT DOCUMENTS

| | | | |
|---|---|---|---|
| 5,077,151 | * 12/1991 | Yasuda et al. | 429/206 |
| 5,348,822 | 9/1994 | Ovshinsky et al. | 429/223 |
| 5,569,562 | 10/1996 | Glemser et al. | 429/223 |
| 5,620,813 | * 4/1997 | Lee et al. | 429/223 |
| 5,718,988 | * 2/1998 | Asano et al. | 429/206 |
| 5,804,334 | * 9/1998 | Yamamura et al. | 429/218 |
| 6,013,390 | * 1/2000 | Kimiya et al. | 429/206 |
| 6,042,753 | * 10/1998 | Izumi et al. | 252/521.2 |
| 6,066,416 | * 7/1998 | Okada et al. | 429/223 |
| 6,074,785 | * 6/2000 | Dansui et al. | 429/223 |

FOREIGN PATENT DOCUMENTS 09115543    5/1997  (JP) .

OTHER PUBLICATIONS

P. Oliva, et al., Review Of The Structure And The Electrochemistry Of Nickel Hydroxides And Oxy–Hydroxides, *Journal of Power Sources, 8* (1982) pp. 229–255.

I. Matsumoto, et al., Foamed Nickel Positive Electrode For A High Performance Cylindrical Ni–Cd Battery, *Power Sources 12*, (1998) pp. 203–220.

Hiromichi Ogawa, et al., Metal Hydride Electrode For High Energy Density Sealed Nickel–Metal Hydride Battery, *Power Sources 12*, (1998) pp. 393–410.

* cited by examiner

*Primary Examiner*—Steven P. Griffin
*Assistant Examiner*—Jonas N. Strickland
(74) *Attorney, Agent, or Firm*—Akin, Gump, Strauss, Hauer & Feld, L.L.P.

(57) ABSTRACT

The present invention discloses a cathode active material for an alkaline storage battery, which has a high energy density and a high cycle stability. The cathode active material includes particles of a solid solution or eutectic mixture nickel oxide, which has a crystal structure of $\beta$-Ni(OH)$_2$ and contains at least Mn, where Mn has a mean valence of not less than 3.3, and a coating layer of a solid solution or eutectic mixture cobalt oxide formed on the surface of the particles, which contains at least one element of Ni and Mn.

7 Claims, 2 Drawing Sheets

CATHODE ACTIVE MATERIAL FOR ALKALINE STORAGE BATTERY AND CATHODE USING THE SAME

BACKGROUND OF THE INVENTION

The present invention relates to a cathode active material for a high-capacity alkaline storage battery, which mainly consists of a metal oxide containing nickel as a primary metallic element, as well as to a cathode using such an active material.

With the recent advance in semiconductor technology, development of small-sized, light-in weight, multi-functional electronic apparatuses, such as cellular phones and notebook computers, has been proceeded rapidly. The small-sized, light-in weight alkaline storage battery has thus been highly required for the power source of such portable apparatuses.

Nickel oxide (NiOOH) is generally used for the active material of the cathode for an alkaline storage battery. A three-dimensional foamed nickel porous substrate having a high porosity (95%) has replaced the conventional sintered substrate. The electrode obtained by closely packing nickel oxide powder into the foamed nickel porous substrate (foamed metal electrode) has been adopted for industrial applications (U.S. Pat. No. 4,251,603). This remarkably improves the energy density of the nickel cathode.

One important technique for providing a nickel cathode of high energy density improves the method of manufacturing the active material, nickel oxide powder. The conventional method of manufacturing nickel oxide powder makes an alkaline aqueous solution, such as sodium hydroxide, react with an aqueous solution of nickel salt to precipitate nickel hydroxide. After the growth of the crystal by aging the precipitate, the nickel hydroxide crystal is mechanically ground. This method requires the complicated process and gives the nickel hydroxide powder of non-fixed shape. This makes it difficult to provide an electrode of high packing density.

As described in Japanese Examined Patent Publication No. Hei 4-80513, the improved manufacturing method has been proposed, which repeats the process of making ammonia react with an aqueous solution of nickel salt to form a nickel-ammonium complex and the process of making an alkali react with the complex to yield nickel hydroxide, thereby causing nickel hydroxide to be grown. Namely this method makes nickel hydroxide deposit on the existing nickel hydroxide. This method enables continuous production of nickel oxide and reduces the manufacturing cost. The quasi spherical shape of the resulting oxide enables the high-density packing.

The active material of nickel oxide thus obtained is high-density particles grown to have a large particle diameter of several tens $\mu$m. This decreases the electronic conductivity of the active material itself and thereby lowers the charge and discharge efficiency of the electrode. Some countermeasures have been proposed; for example, addition of metallic cobalt, cobalt oxide, or metallic nickel to compensate for the electronic conductivity or incorporation of a metallic element other than cobalt or nickel into the active material to form a solid solution and improve the charge and discharge efficiency.

As described in Power Sources 12, p203 (1988), Cd and Co are known examples of the metallic element incorporated into the crystalline nickel oxide to improve the charge and discharge efficiency. Cadmium-free batteries are, however, required from the environmental point of view. Incorporation of Zn and incorporation of three elements, Co, Zn, and Ba, have been proposed, instead of cadmium (U.S. Pat. No. 5,366,831). The technique of incorporating a different metallic element into nickel oxide and forming a solid solution for the purpose of the high charge and discharge efficiency has been known and disclosed, for example, in Japanese Unexamined Patent Publication No. Sho 51-122737.

The improvements in structure of the substrate, particle shape of the active material, composition of the active material, and additives have significantly improved the energy density of the cathode. The practically used cathode has the energy density of about 600 mAh/cc. As described above, however, the requirement for improving the energy density of the power source for small-sized, portable apparatuses has been enhanced more and more. Another approach to improve the energy density of the battery modifies the anode and the cathode, the electrolyte, and the separator as well as its cell structure.

Practical use of a metal hydride having a high energy density for the conventional cadmium anode (Power Sources 12, p393 (1988)) has raised the volume energy density of the anode to at least double the energy density of the cathode. The technical advance, such as formation of a thinner film separator or high-density packing of the electrode material, has remarkably improved the energy density but substantially reached the limit.

The most effective technique for further improving the energy density increases the energy density of the cathode, which occupies almost half the volume of the battery.

There are some approaches of increasing the packing density of the electrode material to improve the energy density of the cathode; for example, an improvement in tap density of the active material particles, reduction of the amount of the additives, and reduction of the amount of the metal included in the foamed nickel substrate. These techniques, however, have substantially reached the limit. It is accordingly necessary to modify the active material itself with a view to improving the reactivity and the reaction order.

The nickel oxide conventionally used as the active material of the cathode has the structure of $\beta$-Ni(OH)$_2$ (divalent oxide) when being packed into the electrode substrate. It is said that the $\mu$-Ni(OH)$_2$ is reversibly changed to $\mu$-NiOOH (trivalent oxide) through the charge-discharge reaction accompanied with an exchange of one electron. The $\mu$-NiOOH in the charged state is excessively charged and oxidized to the highly oxidized structure $\gamma$-NiOOH (valence: 3.5 to 3.8). The $\gamma$-NiOOH is an irreversible stoichiometric material having the disordered crystal structure (J. Power Sources 8, p229 (1982)).

This $\gamma$-NiOOH is electrochemically inactive and results in a voltage drop and a decrease in capacity. The wider inter-layer distance of $\gamma$-NiOOH expands the volume of the electrode and thereby causes a lot of troubles, for example, the defected contact of the active material with the electrically conductive agent or the substrate, release of the active material from the substrate, and intake of water molecules to dry up the electrolyte. It is accordingly required to interfere with production of $\gamma$-NiOOH.

In order to attain the high energy density of the active material including nickel oxide as the base material, it is extremely important to take advantage of the high-order oxide, $\gamma$-NiOOH. One proposed material has the structure similar to an $\alpha$-type hydroxide obtained by substituting part of Ni with another metallic element, such as Mn(III), Al(III), or Fe(III), and taking anions and water molecules between the layers (U.S. Pat. Nos. 5,348,822 and 5,569,562). It is thought that this oxide is reversibly changed to the high-order oxide having the structure similar to $\gamma$-NiOOH through charge and discharge. This oxide, however, has a wide inter-layer distance and a low density (true density), which make the high density packing difficult, and is not practical.

The inventors of the present invention have noted the active material that has the β-type crystalline structure in the process of filling into the electrode and is reversibly changed to the high-order oxide, γ-NiOOH through charge and discharge. The inventors have proposed modification of the nickel oxide by incorporating another metallic element with a view to attaining the charge and discharge reaction accompanied with an exchange of more than one electron. A composition including Mn as the primary component has also been proposed for the metallic element incorporated into the nickel oxide (Japanese Unexamined Patent Publication No. Hei 9-115543). As disclosed in this reference, incorporation of Mn into the nickel oxide enhances the mobility of protons and the electronic conductivity and thereby improves the utilization.

The solid solution nickel oxide with Mn incorporated therein has already been proposed in Japanese Unexamined Patent Publication No. Sho 51-122737, No. Hei 4-179056, and No. Hei 5-41212. The inventors have also noted the solid solution nickel oxide with Mn incorporated therein. The inventors have found that this solid solution nickel oxide is readily charged and oxidized to the γ-phase by regulating the valence of the incorporated Mn and discharged to attain the high-order reaction having the valence of not less than 1.2. The inventors have also proposed the method of synthesizing such a solid solution nickel oxide to attain the high density.

As described above, one proposed method uses the solid solution or eutectic mixture nickel oxide with Mn incorporated therein for the cathode active material, in order to improve the charge and discharge efficiency and the reaction order. In the proposed material, however, γ-NiOOH is produced during normal charging and allows reversible charge and discharge. The expansion and contraction of the active material in the electrode may accordingly destroy the conductive network of the cobalt compound. This interferes with production of the γ-phase and result in a little lower cycle stability, compared with the conventional nickel oxide in which charge and discharge reaction proceeds with an exchange of approximately one electron.

The object of the present invention is thus to attain the remarkably high energy density by effectively utilizing the γ-phase for the charge and discharge reaction and to provide a cathode active material for an alkaline storage battery having the excellent cycle life property.

BRIEF SUMMARY OF THE INVENTION

The present invention provides a cathode active material for an alkaline storage battery comprising particles of a solid solution or eutectic mixture nickel oxide, which has a crystal structure of β-Ni(OH)$_2$ and contains at least Mn, where Mn has a mean valence of not less than 3.3, and a coating layer of a solid solution or eutectic mixture cobalt oxide formed on the surface of the particles, which contains at least one element of Ni and Mn.

It is here desirable that the content of the at least one element of Ni and Mn in the coating layer is not less than 0.5% by mole and not greater than 20% by mole of all metallic elements included in the coating layer, and more desirably should be in a range of not less than 0.5% by mole and not larger than 10% by mole.

The content of the above-mentioned coating layer is desirably not less than 1% by weight and not greater than 20% by weight of nickel oxide on the basis of hydroxide.

It is also preferable that the cathode active material is powder of a spherical or quasi spherical shape having a tap density of not less than 1.7 g/cc.

The present invention also provides a cathode for an alkaline storage battery including the above active material.

It is preferable that the cathode further includes particles of an yttrium oxide.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
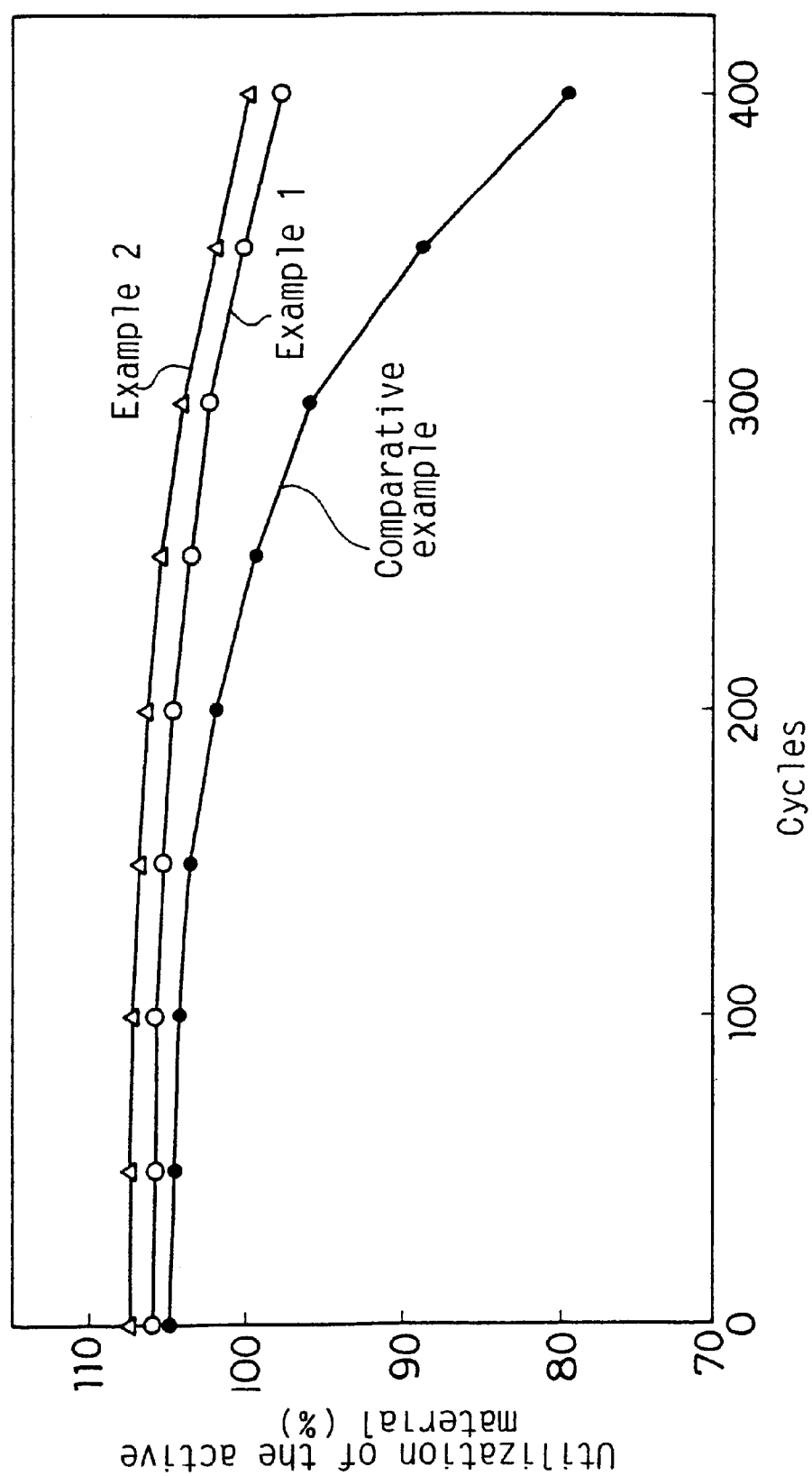
FIG. 1 is a characteristic chart showing the relationship between the number of charge-discharge cycles and the utilization of the active material with respect to nickel-metal hydride storage batteries using the cathode active materials according to examples of the present invention.

The inventors of the present invention have found that charge-discharge reactions accompanied with an exchange of at least two electrons proceed in the nickel oxide containing at least Mn in a solid solution state or an eutectic mixture state, where Mn has a mean valence of not less than 3.3. Although the detailed mechanism has not been elucidated yet, this oxide is charged to be oxidized to a γ-phase in a higher oxidation state, which is readily discharged. This is ascribed to the fact that incorporation of Mn having the different valence from that of Ni into the nickel oxide improves the mobility of protons and the electronic conductivity in the nickel oxide. The oxide has the β-Ni(OH)$_2$ structure, which has a high density in the discharged state, and thereby possesses an excellent packing property, so as to give the cathode of the high energy density.

In the active material of the present invention, the coating layer of the cobalt oxide includes at least one element of Ni and Mn. Ni and/or Mn enhance the physical and chemical stability of the cobalt oxide. It is thought that this effectively prevents dissolution of the coating layer due to the repeated charge and discharge cycles or physical destruction of the particles due to expansion and compression. This arrangement enables the coating layer of the cobalt oxide to keep the conductive network through the charge and discharge cycles over a long time period and thereby maintains the effect of the improved utilization of the active material.

The above effects are especially significant when the content of the at least one element of Ni and Mn included in the coating layer of the cobalt oxide is not less than 0.5% by mole of all metallic elements included in the coating layer. The content of greater than 20% by mole causes slightly lowered conductivity, which may result in lowering the reaction order. It is accordingly preferable that the content is not greater than 20% by mole.

If the content of the at least one element of Ni and Mn exceeds 10% by mole, then crystallization will be disturbed, making the forming particles become bulky. Therefore, more desirable contents are in a range of not less than 0.5% by mole and not greater than 10% by mole.

The amount of the cobalt oxide for coating the nickel oxide is suitably in a range of not less than 1% by weight and not greater than 20% by weight of the nickel oxide on the basis of hydroxide.

Amounts of less than 1% by weight may prevent the cobalt oxide from adequately functioning as a conductive network, which reduces the discharge efficiency. Amounts of greater than 20% by weight, on the other hand, increase the production cost and disturb crystallization, making the forming particles bulky. As such, the amounts of the cobalt oxide out of the above-mentioned range of not less than 1% by weight and not greater than 20% by weight have significant disadvantages.

Addition of the particles of an yttrium oxide to the cathode using the above active material significantly improves the charging efficiency at high temperatures.

For the high energy density of the cathode, it is preferable to improve the reaction order as well as to make the packing density of the electrode at least equivalent to that of the conventional electrode. In order to make the packing density of the electrode at least equivalent to that of the conventional electrode, the particles of the active material are powder of a spherical or a quasi spherical shape having the tap density of not less than 1.7 g/cc.

In the following paragraphs, the present invention will be described in more detail, referring to examples.

EXAMPLE 1

The following first describes the method of synthesizing the active material. The method provided an aqueous solution containing 2.16 mol/l $NiSO_4$ and 0.24 mol/l $MnSO_4$, an aqueous solution of 5.52 mol/l NaOH, and an aqueous solution of 4.8 mol/l $NH_3$, and continuously fed these aqueous solutions into a reaction vessel kept at 40° C. The feeding rates of the respective aqueous solutions were regulated, in order to make pH of the mixed solution in the reaction vessel in the range of 11.5 to 12.5. At the same time, gaseous Ar was continuously fed into the solution in the reaction vessel at the flow of 800 ml/min, so that the concentration of oxygen dissolved in the solution was kept to be not greater than 0.05 mg/l. Agitating blades set in the reaction vessel were rotated at a fixed rotating speed, in order to enable these aqueous solutions and the gas to be mixed homogeneously. The overall feeding rate of Ni ions and Mn ions fed to the reaction vessel was calculated to be $1.2\times10^{-3}$ mol/min from the concentrations and the feeding rates of the aqueous solutions.

When the pH of the solution in the reaction vessel was kept substantially constant and the concentration of the metal salt and the concentration of the produced oxide particles were in the substantially stationary state, the method collected the suspension overflowing the reaction vessel and separated a precipitate by decantation. The precipitate was washed with water, and the precipitate wet with water, that is, the metal oxide powder, was dried in the atmosphere at 80° C. for 72 hours.

The resulting metal oxide particles "a" were spherical particles having the mean particle diameter of 10 μm. The ICP emission spectroscopic analysis showed that the ratio of metallic elements in the particles was Ni:Mn=9:1 (atomic ratio). The total valence of all the metals was measured by iodometry, and the mean valence of Mn was calculated to be 3.5 from the total valence. The XRD pattern showed that the nickel oxide was $\beta Ni(OH)_2$ of the single phase. Since there was a correlation between the mean valence or the content of Mn and the lattice constant (Vegard's law), it was confirmed that Mn was substituted for part of Ni.

While the metal oxide particles "a" were stirred in water, a mixed aqueous solution containing 0.09 mol/l $CoSO_4$ and 0.01 mol/l $NiSO_4$, an aqueous solution of 0.23 mol/l NaOH, and an aqueous solution of 0.4 mol/l $NH_3$ were added dropwise. This caused Ni-containing cobalt oxide to gradually deposit on the surface of the metal oxide particles "a". Here the gaseous argon was fed into the reaction vessel, in order to prevent oxidation of Co due to the dissolved oxygen.

The method then filtered the suspension containing the particles, washed the particles with water, and dried to yield an active material A. The amount and the composition of the coating layer in the active material A that covers the particles "a" were calculated from the result of the ICP emission spectroscopic analysis and the composition of the particles "a". The ratio of the metallic elements in the coating layer was Co:Ni=9:1 (atomic ratio), and the amount of the coating layer was 7% by weight on the basis of hydroxide.

EXAMPLE 2

An active material B, in which a coating layer of Mn-containing cobalt oxide was formed on the surface of the metal oxide particles "a", was obtained by the method similar to that of Example 1 for making the coating layer of the active material A, except that the mixed solution of $CoSO_4$ and $NiSO_4$ was replaced by a mixed aqueous solution of 0.09 mol/l $CoSO_4$ and 0.01 mol/l $MnSO_4$. The ratio of the metallic elements in the coating layer calculated in the above manner was Co:Mn=9:1 (atomic ratio), and the amount of the coating layer was 7% by weight on the basis of hydroxide.

COMPARATIVE EXAMPLE

An active material X, in which the surface of the metal oxide particles "a" was coated with cobalt oxide, was obtained by the method similar to that of Example 1 for making the coating layer of the active material A, except that the mixed solution of $CoSO_4$ and $NiSO_4$ was replaced by an aqueous solution of 0.1 mol/l $CoSO_4$.

Batteries were assembled with the active materials A, B, and X thus obtained. The procedure first added 2 g of yttrium oxide powder and 30 g of water to 100 g of each active material powder, and kneaded the mixture to a paste. This paste was packed into a foamed nickel substrate having the polarity of 95%, dried, and molded under pressure. This gave a nickel cathode plate. The cathode plate was cut into a predetermined size, and electrode leads were spot welded to the cathode plate of the predetermined size. This gave a nickel cathode having a theoretical capacity of 1300 mAh. The theoretical capacity of the nickel electrode was calculated on the assumption that the Ni in the active material underwent one-electron reaction.

A known anode for the alkaline storage battery was used for the anode. Here a hydrogen-absorbing alloy $MmNi_{3.55}Co_{0.75}Mn_{0.4}Al_{0.3}$ prepared by the following method was used for the anode. The method melted a mixture of Mm, Ni, Co, Mn, and Al, which was mixed at a desired ratio, in an arc furnace to yield a hydrogen-absorbing alloy of a desired composition. The alloy block was mechanically ground to a powder having a particle diameter of 30 μm in an inert atmosphere. The method added water and carboxymethylcellulose as a binder to the powder and kneaded the mixture to a paste. The paste was packed into an electrode substrate under pressure to give an anode plate of the hydrogen-absorbing alloy. The anode plate was then cut into a predetermined size. This gave an anode having a capacity of 2000 mAh.

The anode and the cathode were combined with each other via a separator composed of a sulfonated polypropylene non-woven fabric having a thickness of 0.15 mm to form a spiral set of electrodes. The set of electrodes was inserted into a battery case. After injection of 2.2 ml of an electrolyte, that is, an aqueous solution of 9 mol/l KOH, the opening of the battery case was sealed with a sealing plate having a safety valve of a working valve pressure of about 20 $kgf/cm^2$. This gave a cylindrical sealed nickel-metal hydride storage battery of size AA.

The properties of the sealed batteries respectively including the electrodes of the active material A of Example 1, the active material B of Example 2, and the active material X of Comparative Example as the cathodes were evaluated by the following method. The evaluation method charged each battery with an electric current of 130 mA for 18 hours and discharged with an electric current of 260 mA to the battery voltage 1.0V at 20° C. This charge and discharge cycle was repeated. The discharge capacity was measured, and the relationship between the number of charge and discharge cycles and the utilization of the active material was determined. The utilization of the active material was calculated as the ratio of the actual discharge capacity to the theoretical capacity on the assumption that Ni underwent the one-electron reaction.

FIG. 1 is a characteristic chart showing the relationship between the number of charge and discharge cycles and the utilization of the active material for the respective cathodes. As clearly understood from this chart, whereas the utilization of the battery including the active material X of Comparative Example was lowered over 300 cycles, the utilization of the active material was not significantly lowered even at 400 cycles in the batteries including the active materials A and B of Examples 1 and 2.

EXAMPLE 3

This example changed the mixing ratio of the Co salt to the Ni salt in the process of making the coating layer of the active material A in Example 1, so as to yield active materials having the varied ratio of Ni to all the metallic elements in the coating layer. The ratio of Ni to all the metallic elements included in the coating layer was changed as 0, 0.3, 0.5, 10, 20, and 25% by mole.

Cylindrical sealed batteries like Example 1 were prepared with the cathodes of these active materials. The relationship between the number of charge and discharge cycles and the utilization of the active material was measured under the same conditions.

Figure 2:
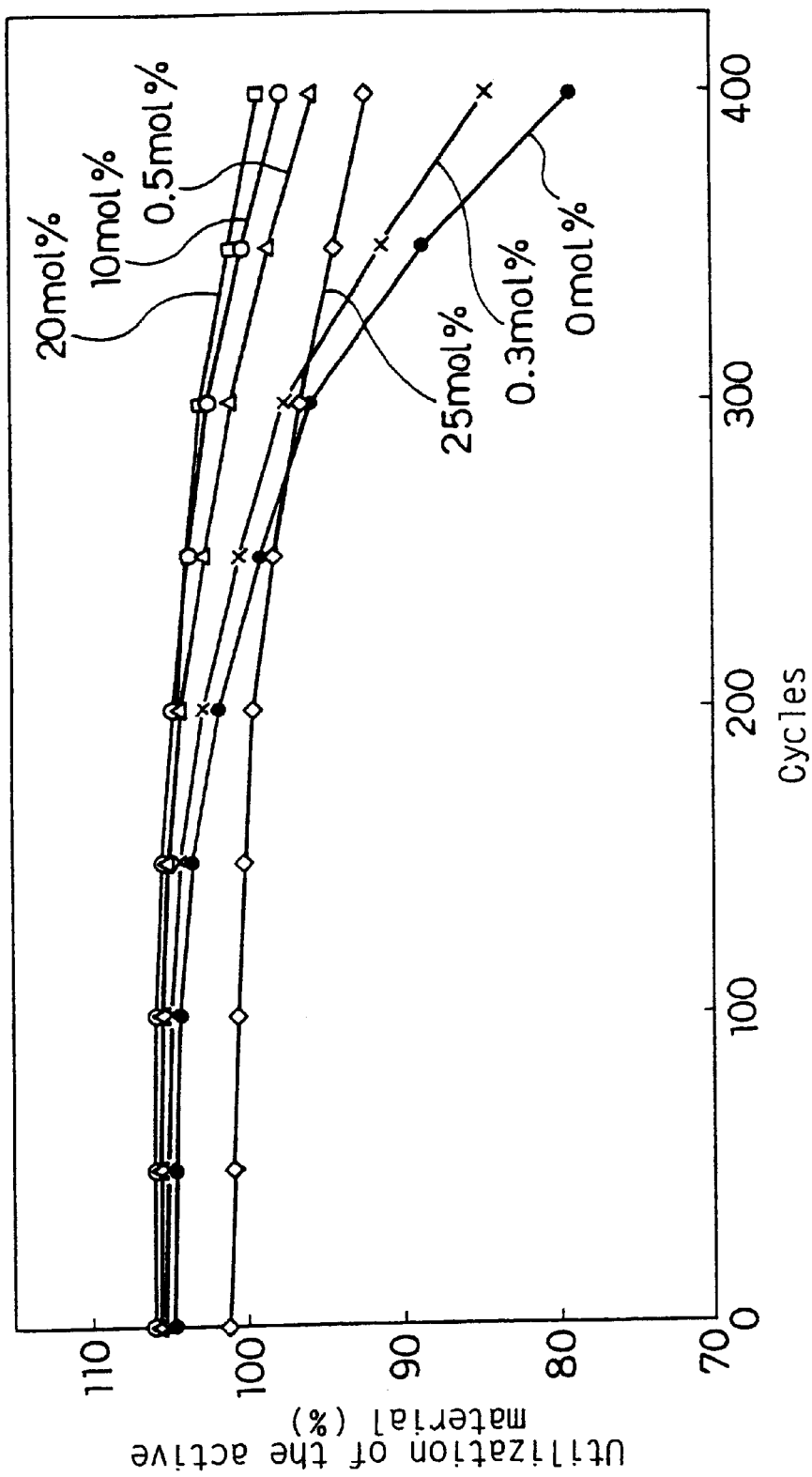
FIG. 2 is a characteristic chart showing the relationship between the number of charge-discharge cycles and the utilization of the active material with respect to nickel-metal hydride storage batteries using the active materials having the coating layers of different Ni contents.

FIG. 2 is a characteristic chart showing the relationship between the number of charge and discharge cycles and the utilization of the active material for the respective cathodes. As clearly understood from this chart, the utilization of the active material was not significantly lowered at 400 cycles when the content of Ni was not less than 0.5% by mole. The content of Ni greater than 20% by mole resulted in a lower utilization from the initial state. This is ascribed to the fact that an extremely decrease in content of Co in the coating layer lowers the conductivity of the coating layer. This means that the suitable content of Ni in the coating layer is not less than 0.5% by mole and not greater than 20% by mole.

The similar results were obtained with respect to the active material B of Example 2. This shows that the suitable content of Mn in the coating layer is not less than 0.5% by mole and not greater than 20% by mole.

Although only either one of Ni and Mn is included in the coating layer in the above examples, the modified structure in which both Ni and Mn are included in the coating layer has the similar effects.

In the above embodiments, the coating layer includes cobalt hydroxide as the primary component. The cobalt oxide layer obtained by oxidizing cobalt hydroxide has the similar effects. In this case, the suitable content of Ni or Mn is also not less than 0.5% by mole and not greater than 20% by mole.

The foamed nickel is used for the substrate of the cathode in the above examples. Other porous metal substrates, such as three-dimensional porous metal substrates like nickel felt and two-dimensional porous metal substrates like perforated metal plate, have the similar effects.

As described above, the present invention provides a cathode active material for an alkaline storage battery, which maintains a high utilization over a long time period. This accordingly gives an alkaline storage battery of the improved energy density and cycle properties.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A cathode active material for an alkaline storage battery comprising:

particles of a solid solution or eutectic mixture of nickel oxide, which has a crystal structure of $\beta$-$Ni(OH)_2$ and contains at least Mn, where Mn has a mean valence of not less than 3.3; and a coating layer of a solid solution or eutectic mixture of cobalt oxide formed on the surface of said particles, wherein the solid solution or eutectic mixture of cobalt oxide contains at least one element of Ni and Mn.

2. The cathode active material for an alkaline storage battery in accordance with claim 1, wherein the at least one element of Ni and Mn in said coating layer has a content of not less than 0.5% by mole and not greater than 20% by mole of all metallic elements in said coating layer.

3. The cathode active material for an alkaline storage battery in accordance with claim 2, wherein the at least one element of Ni and Mn in said coating layer has a content of not greater than 10% by mole of all metallic elements in said coating layer.

4. The cathode active material for an alkaline storage battery in accordance with claim 1, wherein an amount of said cobalt oxide for coating said nickel oxide is in a range of not less than 1% by weight and not greater than 20% by weight of the nickel oxide on the basis of hydroxide.

5. The cathode active material for an alkaline storage battery in accordance with claim 1, wherein said cathode active material is a powder of a spherical or quasi spherical shape having a tap density of not less than 1.7 g/cc.

6. A cathode for an alkaline storage battery comprising said active material in accordance with claim 1.

7. The cathode for an alkaline storage battery in accordance with claim 6, said cathode further comprising particles of an yttrium oxide.

* * * * *